United States Patent
Lipetz (10) Patent No.: US 7,865,950 B2
(45) Date of Patent: Jan. 4, 2011

(54) SYSTEM OF ASSIGNING PERMISSIONS TO A USER BY PASSWORD

(75) Inventor: Daniel Lipetz, Flushing, NY (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 11/764,842

(22) Filed: Jun. 19, 2007

(65) Prior Publication Data

US 2008/0320588 A1      Dec. 25, 2008

(51) Int. Cl.
  G06F 7/04      (2006.01)
  G06F 17/30     (2006.01)
  H04L 9/00      (2006.01)

(52) U.S. Cl. .............................. 726/19; 726/16; 726/17; 726/18; 726/20; 713/182; 713/183; 713/184; 713/185

(58) Field of Classification Search .................... 726/19
  See application file for complete search history.

(56) References Cited

U.S. PATENT DOCUMENTS

| | | | |
|---|---|---|---|
| 6,484,263 B1 | 11/2002 | Liu | 713/201 |
| 7,114,078 B2 | 9/2006 | Carman | 713/185 |
| 2006/0021036 A1 | 1/2006 | Chang et al. | 726/22 |
| 2006/0085649 A1 | 4/2006 | Wong | 713/183 |
| 2006/0112424 A1 | 5/2006 | Coley et al. | 726/11 |

OTHER PUBLICATIONS

Watt et al. "A Shibboleth—Protected Privilege Management Infrastructure for e-Science Education"; vol. 00,Proceedings of the Sixth IEEE International Symposium on Cluster Computing and the Grid (CCGRID'06) pp. 357-364 (2006); ISBN:07695-2585-7.

Ka Ping Yee et al.; "Passpet: Convenient Password Management and Phishing Protection" pp. 32-43; Proc. of the Second Symposium on Usable Privacy and Security (SOUPS) Jul. 12-14, 2006 Pittsburgh, PA;ACM International Conf. Proceeding Series.

Shirley Gaw et al., "Password Management Strategies for Online Accounts" pp. 44-55; Proc. of the Second Symposium on Usable Privacy and security (SOUPS) Jul. 12-14, 2006 Pittsburgh, PA;ACM International Conf. Proceedings Series.

Furkan Tari et al., "A Comparison of Perceived and Real Shoulder-Surfing Risks Between Alphanumeric and Graphical Passwords" pp. 56-66, Proc. of the Second Symposium on Usable Privacy and Security (SOUP) Jul. 12-14, 2006 Pittsburgh, PA;ACM International Conf. Proceeding Series.

*Primary Examiner*—Longbit Chai
(74) *Attorney, Agent, or Firm*—William A. Kinnaman, Jr.

(57) ABSTRACT

A data processing system includes a data storage unit for storing data sets accessible to a user upon receipt of permission. The data processing system restricts access to data sets by requiring a username and then requiring a password to obtain permission for access to a data set stored in a data storage unit. The system is adapted to support use of more than one said password associated with a username; and each of those passwords associated with that username permits a distinct level of access to a particular data set, whereas other passwords can provide different levels of access to any data set assigned thereto.

20 Claims, 8 Drawing Sheets

| USERNAME | PASSWORD | PERMISSIONS | DATA SET(S) |
|---|---|---|---|
| DANIEL | PASS1 | READ WRITE EXECUTE (RWEP) | SETS A, B, AND C |
| DANIEL | PASS2 | READ ONLY (ROP) | SETS A, B, AND C |
| DANIEL | PASS3 | READ ONLY (ROP) | SET A |
| DANIEL | PASS4 | READ WRITE (RWP) | SETS B AND C |
| DANIEL | PASS5 | READ ONLY (ROP) | SET D |

| USERNAME | PASSWORD | PERMISSIONS | DATA SET(S) |
|---|---|---|---|
| DANIEL | PASS1 | READ WRITE EXECUTE (RWEP) | SETS A, B, AND C |
| DANIEL | PASS2 | READ ONLY (ROP) | SETS A, B, AND C |
| DANIEL | PASS3 | READ ONLY (ROP) | SET A |
| DANIEL | PASS4 | READ WRITE (RWP) | SETS B AND C |
| DANIEL | PASS5 | READ ONLY (ROP) | SET D |

FIG. 7

SYSTEM OF ASSIGNING PERMISSIONS TO A USER BY PASSWORD

BACKGROUND OF THE INVENTION

This invention relates to provide software security by controlling access to data processing systems, and more particularly to any data processing security system in requiring the user to employ a username and a password to gain access to data.

Figure 1:
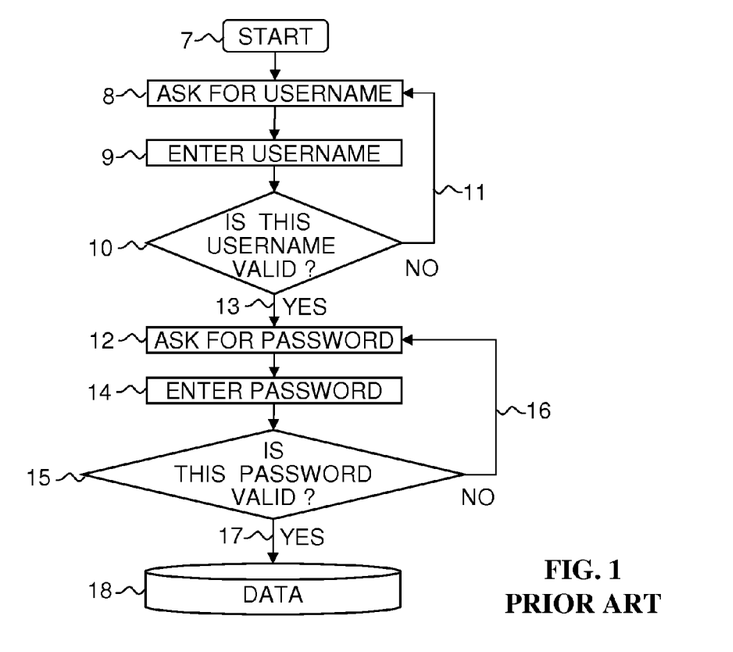
FIG. 1 is a flow chart which illustrates a typical prior art username/password system and how a user can access data in a data base.

FIG. 1 is a flow chart illustrating a typical prior art username/password system for gaining access to data stored in a shared data storage device 18 of a data processing system (hereinafter "system") accessible by multiple users. When a potential user addresses the system as indicated by START block 7 in FIG. 1, the response of the system in username request block 8 is to request a username (e.g. a credit card number, or any equivalent identifier referred to hereinafter as a username.) Then to gain access to shared data in the data storage device 18, the user must enter a username in a username entry block 9 (e.g. by key entry on a keyboard or by stating the username over a telephone or microphone, etc.) Then the username decision block 10 of the system makes a decision as to whether the username is valid (YES) or invalid (NO). If the username entered is invalid, then the system sends a signal (indicated by a username invalid line 11 back to the username request block 8 where the system again asks for a username, which makes it possible for the potential user to enter a correct username in the username entry block 9, if the choice is made to repeat an attempt to gain access to the data in the system.

When the username decision block 10 determines that username entered is valid (YES), the next step by the system is for the password request block 12 to respond by sending a signal (indicated by a username valid line 13) to the password request block 12 requesting entry of a password (which may comprise a Personal Identification Number (PIN), an access code, or the like.) Then the potential user must enter a password as indicated by the password entry block 14. Next, as indicated by the password validity decision block 15, the system decides whether the password that was entered is valid (YES) or invalid (NO.) If the password entered is invalid, the system sends a signal (indicated by the password invalid line 16) back up to the password request block 12 where the system will repeat the request for a password.

If the password entered in the password entry block 14 is valid, the password validity decision block 15 provides a YES signal on the password valid line 17 granting the user access to the data as the system provides access to the data block associated with the username and the password in the shared data storage device 18. This is how all commercially available accounts normally work, e.g. UNIX, email, Windows, etc. For each username there is only one password, which must be entered in block 14. The data stored in the shared data storage device 18 is accessible when the correct username is entered in the username entry block 9 followed by entry of the correct password in the password entry block 14 for the data associated with the username.

Heretofore internet users have often logged into websites that require password identification. Often users need to use public terminals at libraries or airports. Additionally, many users share computers belonging to others when they have no access to their own computers. A security problem exists because the user is usually unaware of what malware, spyware, key loggers, or any other security holes there may be in the system. This makes users uneasy about using a password or such shared machines. Thus there is the problem that businesses lose customers who refuse to visit the sites of shared computers because of such security concerns.

For example, many users or customers perform banking online, but many of such users are hesitant to use a password on a public computer terminal because they fear that an unauthorized person such as a thief, an investigator, or a data collecting agency could or would gain access to all their information. Such access could permit unauthorized actions such as use of the data or the taking of unauthorized control of the data in the system. Such unauthorized actions would include control of the data in the system information including use of private information, control of assets in accounts, dispensing assets via an Automatic Teller Machine (ATM), transfer of assets to other accounts, commission of identity theft, as well as commission of other crimes and transgressions.

For example, if an authorized user were personally unable to gain access to a computer or computer terminal and wanted to check an email account, the authorized user would be required to give another person access to the username and password for that account. That action is undesirable because people frequently use the same password for multiple accounts. Additionally, by revealing the username and password the person receiving that information would have present and future access to the related account without any limitations.

U.S. Pat. No. 6,484,263 of Liu entitled "Security Profile for Web Browser" discloses a security profile for web browsers with a browser receiving a username-password challenge from a Web server. The user does not have to supply the username and password manually once the triple of (URL, username, password) is stored in the user security profile. The browser sends the challenging Web server the username and password that is associated with the matched URL.

U.S. Patent Application Publication No. US2006/0021036 of Chang et al. entitled "Method and System for Network Security Management" describes providing a user database established at a server comprising a plurality of first usernames and a plurality of corresponding first user passwords. The usernames and corresponding passwords are calculated and obtained for generating a plurality of user key values.

Application Publication No. US2006/0112424, of Coley et al. entitled "Method for Authenticating a User Access Request" uses a firewall to authenticate a user access request that employs first password portions sent from the user over a first medium of communication and second password portions sent to the user over a second medium of communication (i.e. a medium other than the first communication medium) responsive to receiving a valid username and first password portion pair from the user. The firewall may also send a password associated with a username to a mobile device for verification.

U.S. Application Publication No. US2006//0085649 of Wong entitled "Method for Accommodating Multiple Verifier Types with Limited Storage Space with the system receiving a username and a password. Following receipt of a username and password the system looks up an associated verifier type and verifier based on a username; with the verifier generated for the user password, and allows a computer system to offer different verifier type to a newly added user.

U.S. Pat. No. 7,114,078 of Carman entitled "Method and Apparatus for Storing Usernames, Passwords Associated Network Addresses In Portable Memory" describes a username and a password associated with a particular URL.

J. Watt et al. "A Shibboleth-Protested Privilege Management Infrastructure for e-Science Education"; Vol. 00, Proceedings of the Sixth IEEE International Symposium on Cluster Computing and the Grid (CCGRID'06) pp 357-364 (2006); ISBN:0-7695-2585-7 describe providing usernames associated with passwords which have varying levels privileges and/or within a privilege management and security infrastructure.

Three articles from the Proceedings of the Second Symposium On Usable Privacy and Security (SOUPS) Jul. 12-14, 2006 Pittsburgh, Pa.; ACM International Conference Proceeding Series, were published, in the ACM International Conference Proceeding Series; Vol. 149; ISBN:1-59593-448-0. The three articles include Ka Ping Yee et al.; "Passpet: Convenient Password Management and Phishing Protection" pp 32-43; Shirley Gaw et al., "Password Management Strategies for Online Accounts" pp 44-55; and Furkan Tari et al., "A Comparison of Perceived and Real Shoulder-surfing Risks between Alphanumeric and Graphical Passwords" pp 56-66. Yee et al. discloses password management and a different password for each account within a browser user interface. Gaw et al. discloses password management for online accounts with users or usernames having three or more passwords relative to a particular environment or need. Furkan Tari et al. discusses the possibility that graphical passwords may offer both a secure and usable solution to network- and Internet-based user authentication.

SUMMARY OF THE INVENTION

Glossary

Logon (log on): Initiation of a session on a computer system, that requires entry of a username that must be accepted by the computer system, which when accepted is followed by entry of a password to gain access to a data set in a secure computer system.

Username (user name): A string of characters that uniquely identifies a user to a system which is used to associate the user profile with a user when a user signs on a computer system. The username is also known as the user ID (user IDentification) or userid. The "umask" also known as the user number (UID) is a number that uniquely identifies a user to the system. It is the internal number associated with a user ID.

Username owner: The user who has authority to create and change passwords associated with a username, and to assign various levels of access privilege to those passwords, which grant permission to perform various functions with or upon data sets owned by the username owner which are stored in the computer system.

Data set: A collection of data stored in a computer system or data stored elsewhere which is accessible to the computer system.

Password (User password): A value used to gain access to a computer system known to the computer system and to a user. The password which comprises a unique string of characters or the like which must be entered into the computer system to identify a user to the system who is entitled to the privilege of gaining access to the computer system and who is entitled to permission to have access to one or more data sets stored in or accessible to the computer system.

User profile: In computer security, the user profile is a description of a user that includes such information as user ID, user name, password, access authority, and other attributes obtained at logon. The user profile may comprise an object with a unique name that contains the password of the user, the list of special authorities assigned to a user, and the objects the user owns.

User profile name: A name or code associated by a system with a user when that user signs on the system. It is an authorization ID, which is a name identifying a user to whom privileges can be granted.

User identification and verification: The actions of identifying and verifying a user to a system during logon. The system identifies the user by the userid and verifies the user by the password supplied during logon processing.

Object: In computer security, an object is anything to which access is controlled referred to herein as a data set, e.g. a file, a program, an area of main storage.

User object: The information created by a user within an application.

Privilege: Access to data sets to perform a function with Read Only (RO) access, Read Print (RP) access, Read Write (RW) access, or Read Write Execute (RWE) access to a data set when permission for such access has been granted by the computer system.

As employed herein username is intended to be synonymous with "user name", user id, userid, the umask or the UID or any other logon name, symbol or code which precedes a password in the logon process.

Acronyms:
DS: Data Set
DSA: Data Set A
DSB: Data Set B
DSC: Data Set C
DSD: Data Set D
DSABC: Data Set A, B, C
DSBC: Data Set B, C
RO: Read Only;
ROP: Read Only Permission
RW: Read Write
RWP: Read Write Permission
RWE: Read Write Edit
RWEP: Read Write Edit Permission In accordance with this invention, a username is associated with multiple passwords; and the user has one username. Preferably, a single password allows access as normal with all privileges as normal; and also associated with the same username is another, auxiliary password which has fewer privileges. Further in accordance with this invention, the user is able to set up a plurality of passwords with different privileges granted to the user for different passwords depending upon the comfort level the user has with respect to the machine being used at the time; and the exact privileges can be determined by the user or the web site at the time of creation of the username.

Further in accordance with this invention, apparatus is provided including a data processing system including a data storage unit for storing at least one data set accessible to a user having permission for access thereto. The data processing system has a restriction of requiring a username and then requiring a password associated with the username to obtain permission for access to the data set. The system is adapted to support use of a multiple passwords associated with the username. Each of the multiple passwords associated with the username permits a distinct level of data set access to the at least one data set. Preferably, a user has one username associated with multiple data sets and with the multiple data sets including the one data set, and with the multiple data sets being accessible by entry of the one username and one of the multiple associated passwords. Preferably, one password allows access with all privileges to interact with the at least one data set; and another password associated with the username has fewer privileges to interact with the data set. It is preferred that an owner of a username creates many passwords with different levels of privilege for users of the data set. It is also preferred that one or more data processing units with data storage units for storing data sets are linked together.

In accordance with still another aspect of this invention, a method of operating a data processing system includes a data storage unit for storing data sets accessible to a user upon receipt of permission. Access is restricted to the data processing system by requiring a username and then requiring a password to obtain permission for access to a data set stored in the data storage unit. Access is granted to the system with the username and multiple passwords associated with the username. A distinct level of access to the data set is permitted for each password associated with the username. Preferably, a user has one username associated with multiple data sets wherein the multiple data sets include the one data set, and the multiple data sets are accessible by entry of the username and the password. Preferably, one password allows access with all privileges to interact with the data set; and another password associated with the username has fewer privileges to interact with the data set. Preferably, an owner of a username creates multiple passwords with different levels of privilege for multiple users of the data set. Preferably, one or more data processing units with data storage units for storing data sets are linked together.

In accordance with yet another aspect of this invention, a computer program product comprising a computer readable medium has a computer program recorded therein for responding to a username and multiple passwords for controlling access to data sets; the computer program. Computer program code means receive a username and issue a request for a password. Computer program password means for receive a password and determine whether the password is valid. Computer program access control means determine whether a level of access to a data set can be provided for a given valid password. Computer program access granting means for provide access to a data set upon granting of a level permission. The data processing system has a restriction of requiring a username and then requiring a password to obtain permission for access to a data set stored in the data storage unit. The system is adapted to support use of multiple password associated with a the username; and each of the multiple passwords for the username permits a distinct level of access to the data set. Preferably, a user has one username associated with multiple data sets, with the multiple data sets including the one data set, and with the multiple data sets being accessible by entry of the one username and one of the multiple associated passwords. Preferably, one password allows access with all privileges to interact with the data set; and another password associated with the username has fewer privileges to interact with the data set. Preferably, an owner of a username creates many passwords with different levels of privilege for multiple users of the data set.

In contrast with Chang et al. the present invention embeds a username and password into a pre-shared key; and derives a client key value according to the shared key and internet key exchange mechanism. The server compares the client key value with the user key values, and when the client key value matches one user key, the system calculates the second username and the corresponding password to generate a server key value. The system can assign permissions by password; with one username having multiple passwords capable of varied privileges.

In accordance with this invention a system is provided which employs a single username associated with multiple passwords with only one or a few thereof having the highest levels of privileges of access to one or more data sets. Other ones of those multiple passwords are restricted to lesser levels of privilege, i.e. different lower level passwords are provided with more restrictions to access to data or limited levels of access to data. In other words, different, i.e. higher or greater, levels of restriction are provided by submission of lower level access codes (passwords), which have fewer privileges for access to data associated therewith. For instance, while a banking site user who is the owner (i.e. the assignee) of a username can employ a highly restricted password permitting check writing, fund transfers and changing personal information, an additional highly restricted, lower priority password is associated with the same username but has fewer privileges granted by the owner of that username for use by a designee.

For instance with respect to banking, if a lower priority user (designee) were to log into a data processing system with an lower priority password with fewer privileges the designee would be restricted to an action such as viewing the balances, but would not be allowed to view or change personal information, transfer monies or write checks. This would allow a username owner to perform limited banking functions online with no fear that even in the event that the password employed at that time were stolen that the assets or information of the username owner would be at risk. In accordance with this invention, the username owner can set up many passwords with different levels of privileges, i.e. different levels of restriction, to use depending on the comfort level of the username owner with respect to a machine or data processing system being employed by that owner at any given time or place.

The exact privileges associated with any given password can be determined, i.e. prescribed, by the username owner or the website when the username is created. A more restricted password with lower levels of privileges (higher levels of restriction) can be either a single-use password so that even if the password were stolen the username owner would never risk a catastrophic loss. The more highly restricted, single use password has as much initial functionality as the normal password, but if it were stolen it would not be useful for acts of malfeasance, such as theft. The lower level password with fewer privileges could also be chosen by the username owner so that it could be easily remembered. The username owner would also not fear stealing of the restricted password because it would have limited access to data sets and could be changed easily by the username owner when logged into the system with the normal password.

This invention can be applied to any password based framework. For example, if a username owner were unavailable and one needed to gain access to information in an account on a file system which was password protected by a fully privileged password, it would be possible to ask the username owner to grant use of a more restricted password. Such a more restricted password would grant permission for read-only access to the data associated with the account. This would leave the username owner secure in the knowledge that no one could write or delete to the directories in the account while the information would remain available for viewing by others with limited read-only access to the data. The username owner would be more comfortable granting access with the more restricted password rather than the folly restricted access password.

System and computer program products corresponding to the above-summarized methods are also described hereinbelow.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the detailed description that follows taken in conjunction with the accompanying drawings in which:

The detailed description explains the preferred embodiments of the invention, together with advantages and features, by way of example with reference to the drawings.

DETAILED DESCRIPTION OF THE INVENTION

Figure 2:
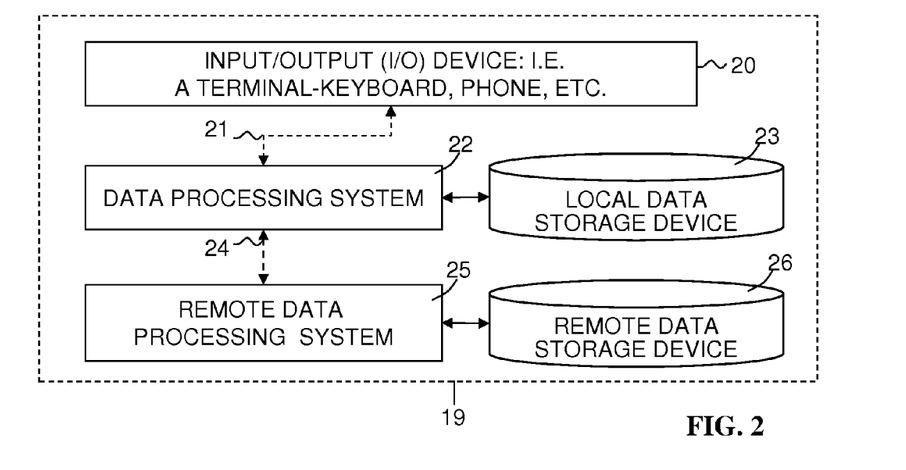
FIG. 2 is a block diagram of a data processing system adapted to embody the present invention and to perform in accordance with the method of this invention.

FIG. 2 is a block diagram of an information system 19 embodying the present invention which employs a username and multiple passwords to control access to a data processing system and to data storage devices controlled thereby. Moreover, the information system 19 which is adapted to operate in accordance with the method of this invention comprises an I/O device 20 (e.g. a keyboard, microphone, or telephone) that can enter a username and a password transmitted over a first data link 21, e.g. a wire or wireless transmission, into a local data processing system 22. The local data processing system 22 is programmed to receive usernames and passwords associated with data sets that are stored in a local data storage device 23 or data sets that are stored in a remote data storage device 26 via a second data link 24 and remote data processing system 25.

First Embodiment

Figure 3:
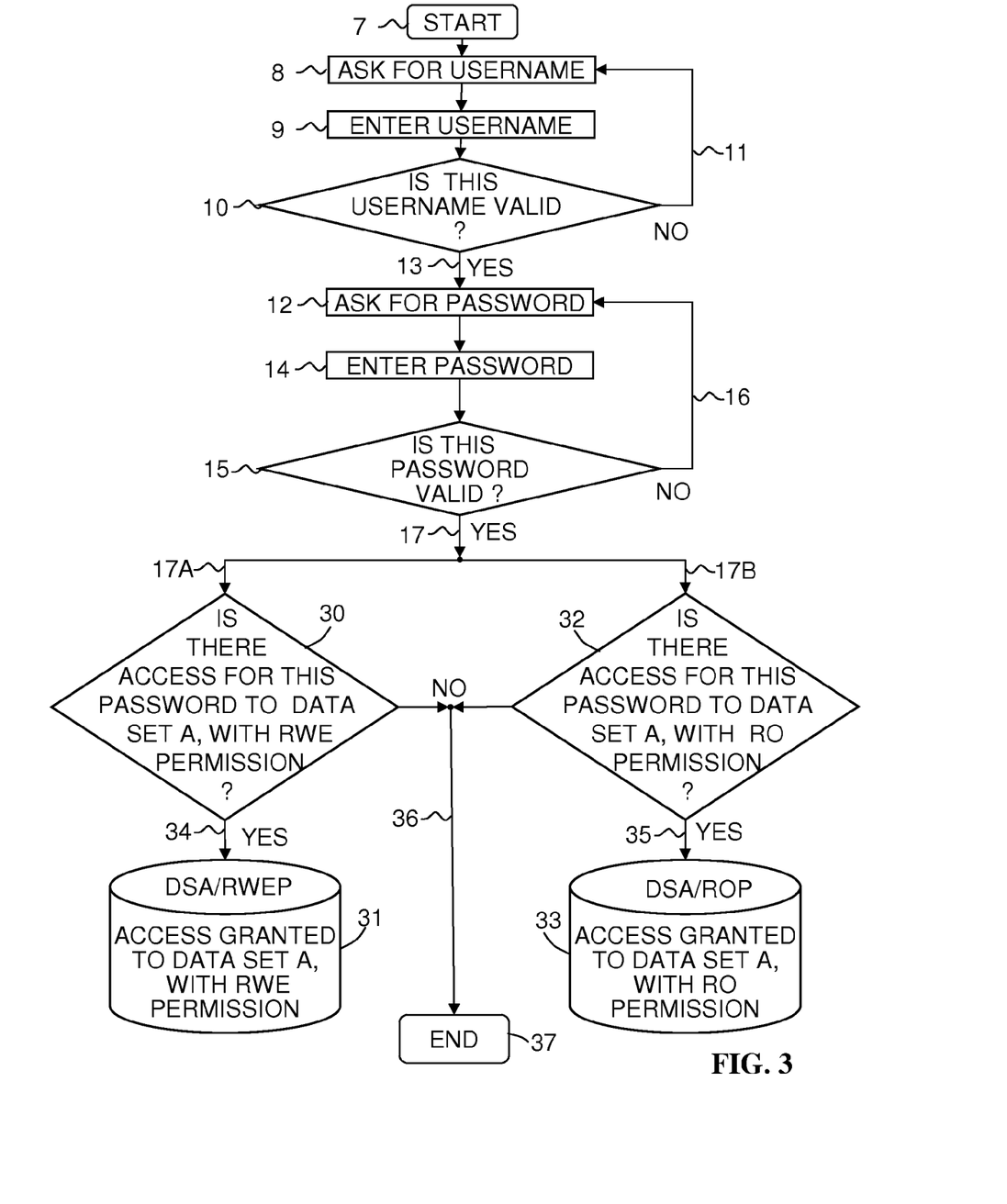
FIG. 3 is a flow chart for a username/password system in accordance with this invention allowing a single username to use different passwords to grant different levels of permission to access a data set stored in the data processing system.

FIG. 3 is a flow chart for a username/password system in accordance with this invention which is a modification of the flowchart of FIG. 1, allowing a single username which uses different passwords to access data in a single data set. Moreover, in the embodiment of FIG. 3 two different levels of permission for one or more data sets are associated with two different passwords. Each of the two different passwords grants permission to access a related one of the two different levels of permission for access to the data set A which, as the case may be, are stored in the access granted to Data Set A Permission (DSAP) block(s) 31/33 of either one or both in the local data storage device 23 in FIG. 2 or in the remote data storage device 26 which are accessible by multiple users. In fact, the Data Set A (DSA) data may be stored in only one data storage location which for convenience of explanation is designated by both access granted to DSA blocks 31/33 in FIG. 3 since the DSA data may be located at either the same location or in separate locations depending upon the particular implementation of this invention.

Referring again to FIG. 3, when a potential user addresses the system is activated as indicated by the start block 7. The username request block 8 of the system responds by requesting a username. Then the user enters a username in the username entry block 9 using an I/O device 20 (FIG. 2) such as a keyboard or stating the username over a telephone or microphone, etc. Then the username decision block 10, of the system makes a decision as to whether the username is valid or invalid (YES or NO). If the username entered is invalid, then the system sends a signal (indicated by the username invalid line 11 back up to username request block 8, whereby the username request block 8 of the system repeats the request for a username, which makes it possible for the potential user to enter a correct username in the username entry block 9 if the choice is made to repeat an attempt to gain access to one or more of two data permission sets in the data set via the access granted to DSA blocks 31/33 of the data storage device (s) 23/26 in FIG. 2. The permission sets include the access granted to DSA Read/Write/Edit Permission (DSA/RWEP) block 31 and the access granted to DSA Read/Only (RO) Permission set (DSA/ROP) block 33.

When the username decision block 10 determines that username entered is valid (YES), the next step for the system is to ask the potential user to enter a password (which may comprise a Personal Identification Number (PIN), an access code, or the like) as indicated by the password request block 12. Then the potential user can enter a password into the password entry block 14. Next, the system decides whether the password is valid (YES) or invalid (NO) in the password validity decision block 15. When the password entered is invalid ($NO_6$) the system returns a signal (as indicated by line 16) to the password request block 12 whereby the system will repeat the request for a password.

In general, if the password is valid, the next step for the system is to determine what high, intermediate, or low level of permission(s) is/are associated with a given password. If for example a high level RWEP level is associated with the password, then the user has total access to a related data set in the storage device based upon that highest level of permission. If the password has only RWP status then the user has only RW access to a related data set in the associated storage device based upon that intermediate level of permission. If the password has only ROP status, then the user has only RO access to a related data set in the associated storage device based upon that lowest level of permission. This approach can be expanded to any number passwords with any combination of permissions and related data sets. This is ideal for an email system where one gives out or uses a password with only RO status on an insecure terminal to permit access for reading email but assuring that nothing in the data base could be changed, such as the settings in the system or composing of an email message.

If the password entered in password entry block 14 in FIG. 3 is valid (YES,) the password validity decision block 15 provides a YES signal on line 17 apparently granting the user access to at least some of the data in the system. The YES signal is passed along line 17 to both line 17A and line 17B. Line 17A leads to DSA/RWEP decision block 30. Line 17B leads to Data Set A Read Only Permission (DSA/ROP) decision block 32. The DSA/RWEP decision block 30 decides whether the user is entitled to the privilege of accessing data set A with RWE permission as indicated by the access granted DSA/RWEP block 31. In parallel, the Data Set A Read Only Permission (DSA/ROP) decision block 32 decides whether the user is entitled to the privilege of accessing data set A with ROP status, as indicated by access granted DSA/ROP block 33. In the unlikely event that neither RWE nor RO Permission is granted, the decision blocks lead on line 36 to END 34.

Thus, if the DSA/RWEP decision block 30 decides that the password entered in block 14 is entitled to RWE permission, then access data set A is granted by the DSA/RWEP block 31 with RWE permission. If the DSA ROP decision block 32 decides that the password entered in block 14 is entitled to be granted ROP access to DSA, then DSA/ROP access is granted to the related data set A by DSA/ROP block 33.

Second Embodiment

Figure 4:
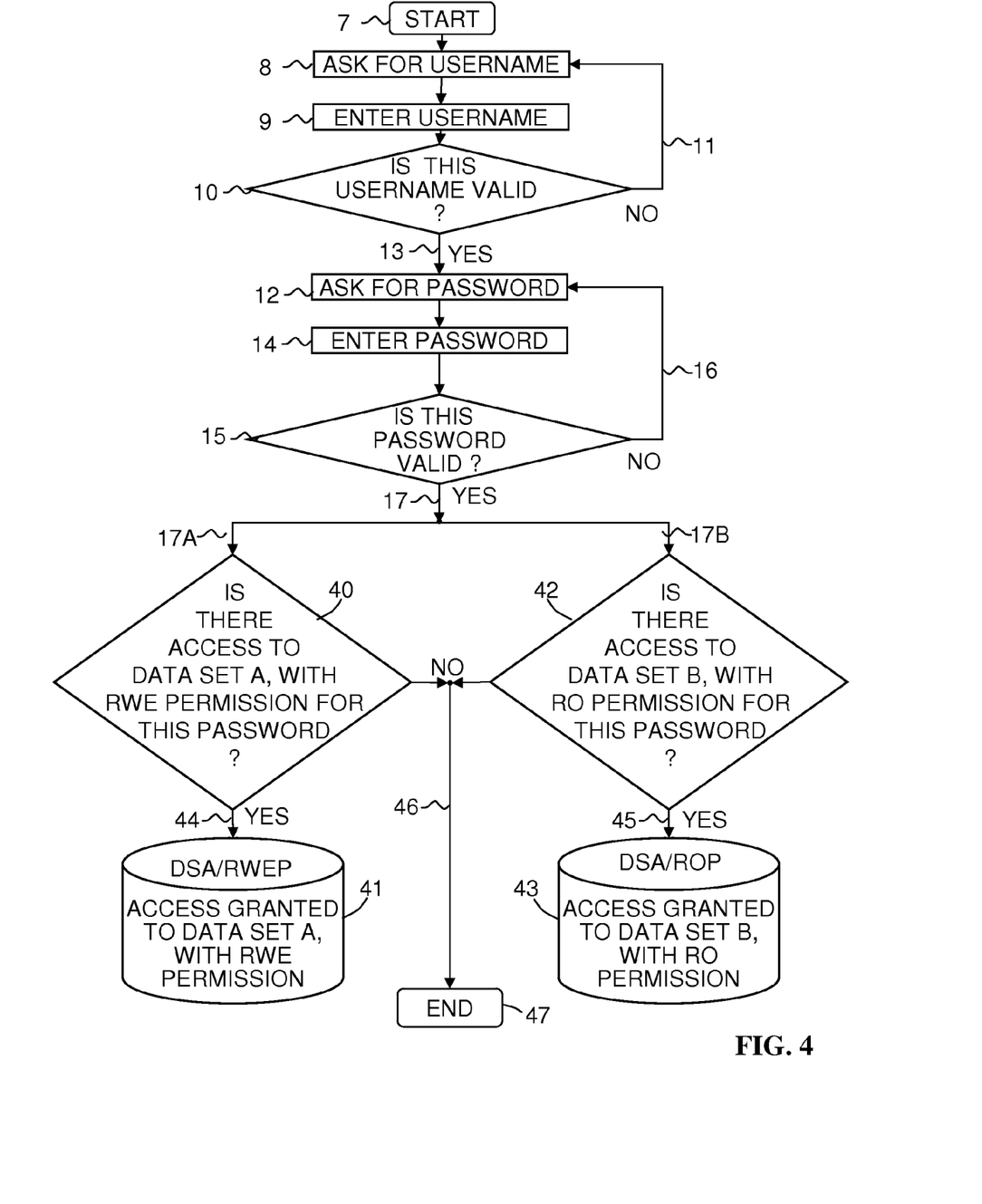
FIG. 4 is a flow chart for a username/password system in accordance with this invention allowing a single username to use different passwords to grant different levels of permission to access two different data sets associated with the username.

In FIG. 4 a modified version of the system of FIG. 3 which is identical except for the decision blocks 40 and 41 and the DSA/RWEP access granted block 41 and the DSB/ROP access granted block 42. The description above is the same up through lines 17A/17B.

In FIG. 4, for the case of data set A, RWEP state can be granted upon submission of an appropriate password. In the case of data set B only RO permission can be granted upon submission of a different, appropriate password. If the username is valid and the password is accepted, then the next step is for the system to determine what level(s) of permissions is/are associated with this password in decision blocks 40 and 41. The decision block 40 tests whether to grant RWEP access to data set A for the password which has just been accepted. If the decision of block 40 is YES, then a signal is sent on line 44 to the DSA/RWEP block 41 which grants the user RWEP access to data set A. In parallel, the decision block 42 tests whether access is to be granted ROP access to data set B for the password which has just been accepted. If the decision of block 40 is YES, then a signal is sent on line 44 to the DSA/ROP block 43, which grants the user ROP access to data set B.

Data set B includes more limited access to records, as the user has only RO permission for access to data set B. The approach shown by FIG. 4 can be expanded to any number passwords with any combination of levels of permissions and any number of data sets A, B, C . . . Z, etc. For example, this can be useful for banking online. A password can give certain access only to a checking account, but can hide the data sets. Another password can give full access to every data set belonging to the owner of the related data.

In the unlikely event that neither level of permission is granted, the decision blocks 40 and 42 lead along line 46 to END 44.

Third Embodiment

Figure 5A:
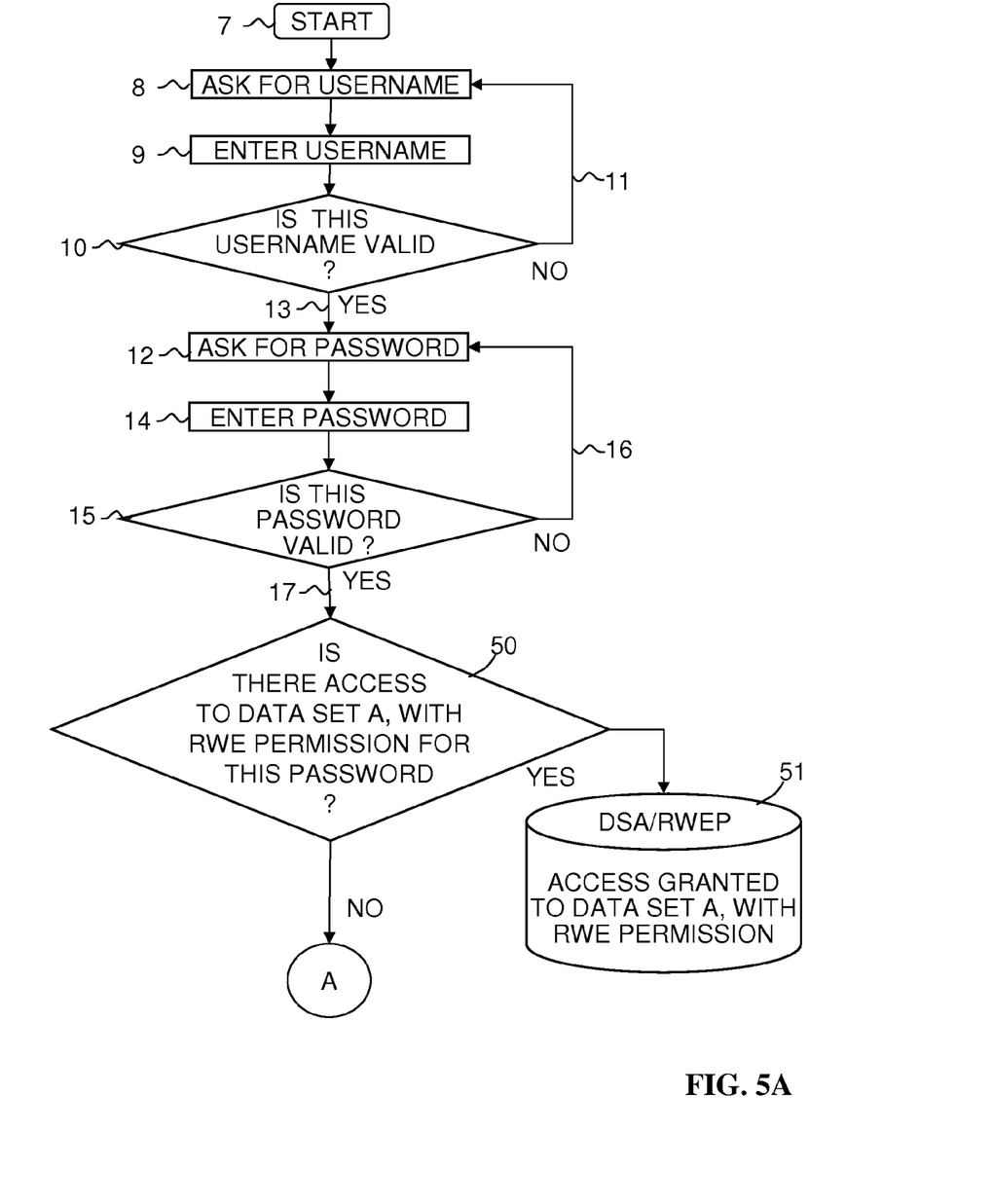
FIGS. 5A and 5B show a flow chart for yet another username/password system in accordance with this invention allowing a single username using different passwords to grant access to four different data sets with different levels of permission.
Figure 5B:
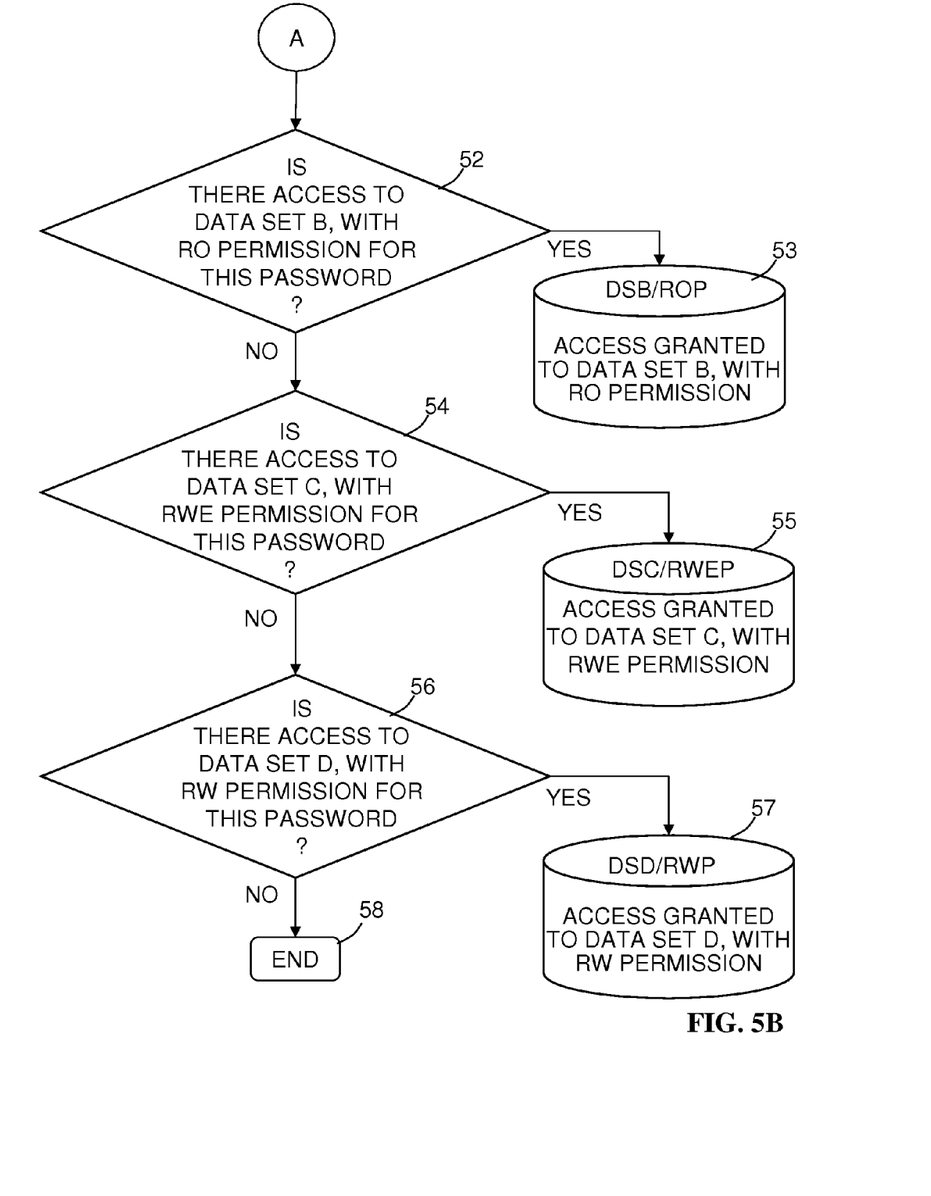

FIGS. 5A-5B show a modification of FIG. 3 wherein the system performs the steps from block 7 to line 17 identically, but then in the descent down a serial decision tree one of four decisions can be made by one of a series of decision blocks 50, 52, 54, and 56 providing access to one of these data sets A, B, C or D with three corresponding different levels of granting of RWEP, RWP or ROP access. The descent down the decision tree ends upon the determination that the password entered by the user provides access to a given data set with a particular level of access or with failure to make a positive determination at the END in step 45.

The decision block 50 which receives activation by a YES signal on line 17 is connected to data storage device 51 with access to data set A. The decision block 50 tests whether access is to be granted with RWEP status for access to data set A for this password. If the decision of block 50 is YES, then the system grants the user DSA/RWEP access to data set A.

If block 50 decides NO, then the system passes via connector A in FIG. 5A to connector A in FIG. 5B down the decision tree to decision block 52, which is connected to data storage device 53 with access to data set B. Decision block 52 tests whether access is to be granted with ROP status to data set B for this password. If block 52 is decides YES, then the system grants the user DSB/ROP access to data set B.

If block 52 decides NO, then the system passes down the decision tree to decision block 54, which is connected to data storage device 55 with access to data set C. The decision block 54 tests whether access is to be granted with RWEP status to data set C for this password. If the decision of block 54 is YES, then the system grants the user DSC/RWEP access to data set C.

If block 54 decides NO, then the system passes down the decision tree to decision block 56, which is connected to data storage device 57 with access to data set D. The decision block 56 tests whether the user is to be granted access with RWP status to data set D for this password. If the decision of Block 56 is YES, then the user is granted DSD/RWP access to data set D.

In the unlikely event that no permission is granted, the decision blocks 50 a leads on line 58 to END 59.

Fourth Embodiment

Figure 6A:
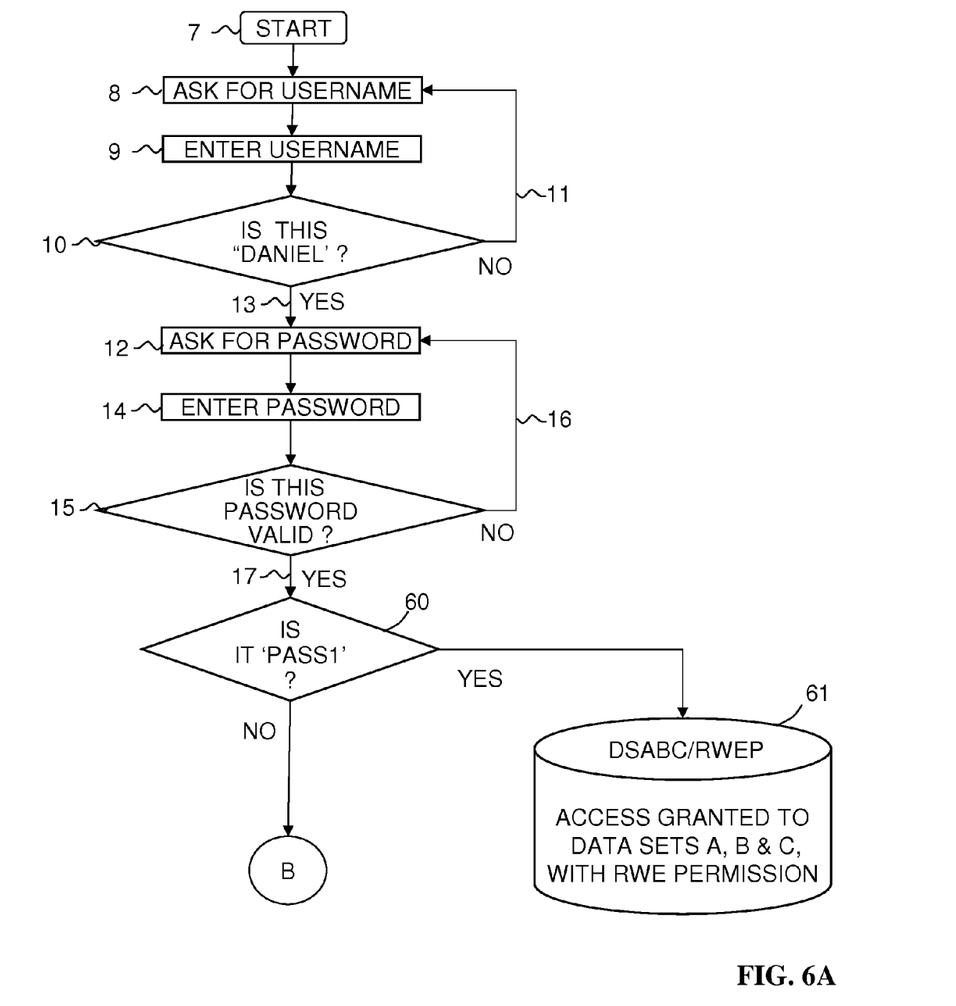
FIGS. 6A, 6B, and 6C show a flow chart for still another username/password system in accordance with this invention allowing a single username using different passwords to access five different combinations of data sets.
Figure 6B:
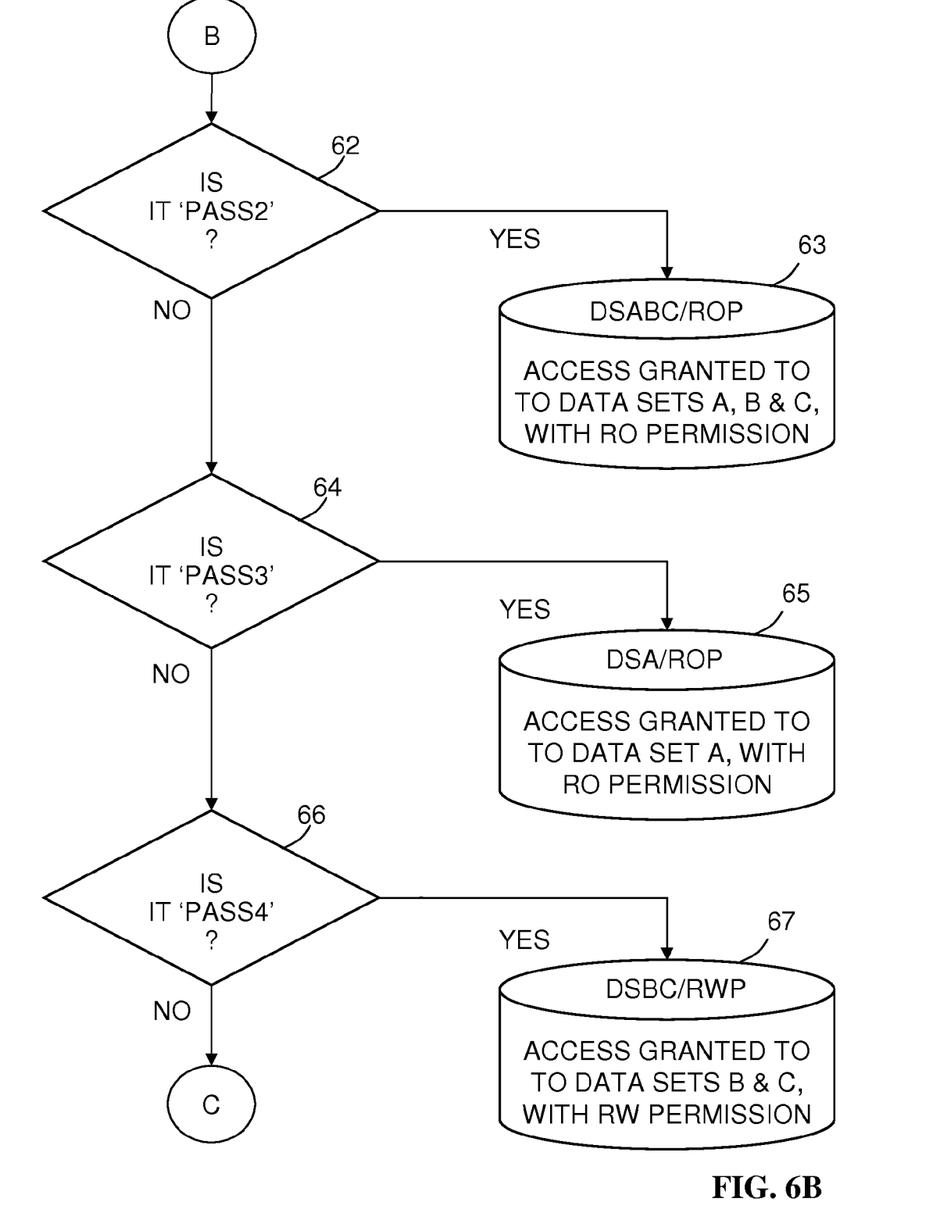
Figure 6C:
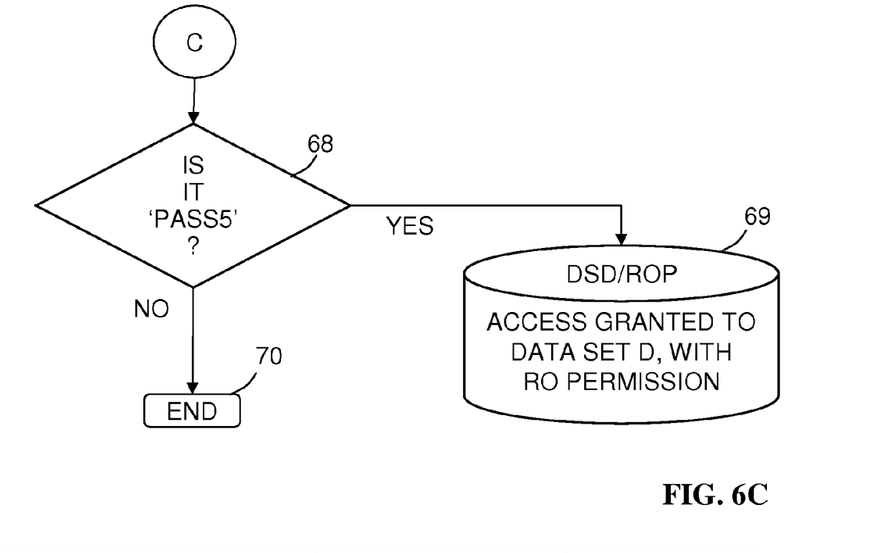

FIGS. 6A-6C show a modification of FIGS. 5A-5B wherein the system performs the steps from block 7 to line 17 in a similar fashion but then in the descent down a serial decision tree one of four decisions can be made by one of a series of decision blocks 50, 52, 54, and 56 providing access to one or more of the data sets A, B, C and D with three corresponding different levels of permission RWEP, RWP and ROP. In this case, as an example, the username is "DANIEL" and username decision block 10 tests for that username. The usual test is made by decision block 15 for a password and if a YES decision is made the system passes on to decision block 60.

The system performs the steps from block 7 to line 17 identically with the added detail that the username in the username decision block 10 must be DANIEL. As with FIGS. 5A and 5B, there is a descent down a serial decision tree during which one of five decisions can be made by one of a series of decision blocks 60, 62, 64, 66 and 68 providing access to one of these data sets A, B, C or D with three corresponding different levels of permission RWEP, RWP, or ROP. The descent down the decision tree ends upon the determination that the password entered by the user provides access to a given data set with a particular level of access or with failure to make a positive determination at the END in step 45.

The decision block 60 which receives activation by a YES signal on line 17 is connected to data storage device 61 with access to data sets A, B, and C. The decision block 60 tests whether access is to be granted by testing as to whether the password is "PASS1" in which case DSABC/RWEP status is to be granted for access to data sets A, B, and C. If the decision of block 60 is YES, then DSABC/RWEP access is granted to the user for access to all three data sets A, B, and C.

If block 60 decides NO, then the system passes via connector B in FIG. 6A to connector B in FIG. 5B down the decision tree to decision block 62, which is connected to data storage device 63 with DSABC/ROP access to data set B. The decision block 62 tests whether the password is "PASS2" in which case DSABC/ROP access is granted to data sets A, B, and C. If the decision of block 62 is YES, then ROP access is granted to the user for all three data sets A, B, and C.

If block 62 decides NO, then the system passes down the decision tree to decision block 64, which is connected to data storage device 65 with DSA/ROP access to data set A. The decision block 64 tests whether the password is "PASS3" in which case DSA/ROP access is to be granted with ROP to data set C for this password. If the decision of block 54 is YES, then DSA/ROP access is granted to the user for data set A.

If block 64 decides NO, then the system passes down the decision tree to decision block 56, connected to data storage device 67 with DSBC/RWP access to data sets B & C. The decision block 66 tests whether the password is "PASS4" in which case DSBC/RWP access is to be granted to data sets B & C. If the decision of Block 66 is YES, then DSBC/RWP access is granted to the user for data sets B & C.

If block 66 decides NO, then the system passes down via connector C in FIG. 6B to connector C in FIG. 6C along the decision tree to decision block 68, connected to data storage device 69 with DSD/ROP access to data set D. The decision block 68 tests whether the password is "PASS5" in which case DSD/ROP access is to be granted to data sets D. If the decision of Block 68 is YES, then DSD/ROP access is granted to the user for data sets D.

In the unlikely event that no permission is granted, the decision block 68 leads to END 70.

Figure 7:
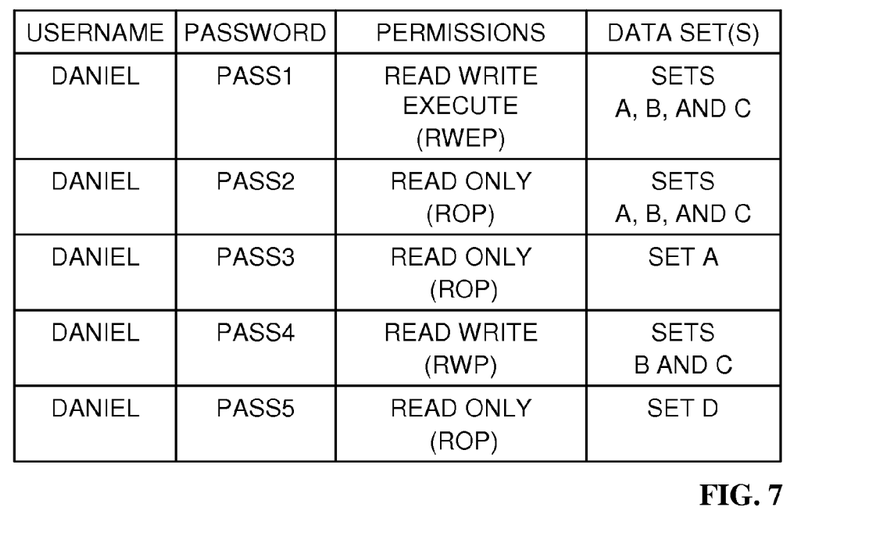
FIG. 7 is a table which shows the single username of FIGS. 6A, 6B, and 6C and the five associated passwords, the five different combinations of data sets with one level of full permission and four restrictive levels of permission to data sets.

FIG. 7 is a table which illustrates the use of a single username using five passwords to access four different sets of data in five different combinations with one level of full permission and three restrictive levels of permission to gain access to data stored in a data base.

FIG. 7 is a table which shows the single username of FIGS. 6A, 6B, and 6C the five associated passwords, the five different combinations of data sets with one level of full permission and four restrictive levels of permission to data sets. The username is DANIEL. For the password PASS1, RWEP is granted for access to data sets A, B, and C. For the password PASS2, ROP is granted for access to data sets A, B, and C. For the password PASS3, ROP is granted for access to data set A. For the password PASS4, RWP is granted for access to data sets B and C. For the password PASS5, ROP is granted for access to data set D.

The capabilities of the present invention can be implemented in software, firmware, hardware or some combination thereof.

For example, one or more aspect of the present invention can be included in an article of manufacture (e.g., one or more computer program products), e.g. having computer usable media; and the media can have a computer readable program code means for providing and facilitating the capabilities of this invention embodied therein. The article of manufacture can be a part of a computer system or can be sold separately.

Additionally, at least one program storage device readable by a machine, tangibly embodying at least one program of instructions executable by the machine to perform the capabilities of the present invention can be provided.

While the flow chart diagrams depicted herein are examples, there may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An apparatus comprising:
    a data processing system including a data storage unit for storing at least one data set accessible to a user having permission for access thereto;
    said data processing system having a restriction of requiring an entry of a username as a logon identifier to initiate a session on a computer and then requiring an entry of a password associated with said username to obtain permission for access to said data set;
    said system being configured to support use of multiple passwords associated with said username and to assign various levels of access privileges to said passwords; and
    each of said multiple passwords independently created and associated with said username permitting a distinct level of data set access to said at least one data set.

2. Apparatus in accordance with claim 1 wherein:
    a user has one username associated with multiple data sets and with said multiple data sets including said one data set, and
    with said multiple data sets being accessible by entry of said one username and one of said multiple associated passwords.

3. Apparatus in accordance with claim 2 wherein one password allows access with all privileges to interact with said at least one data set; and another password associated with said username has fewer privileges to interact with said data set.

4. Apparatus in accordance with claim 3 wherein a one or more data processing units with data storage units for storing data sets are linked together.

5. Apparatus in accordance with claim 2 wherein an owner of a username creates many passwords with different levels of privilege for users of said data set.

6. Apparatus in accordance with claim 5 wherein one or more data processing units with data storage units for storing data sets are linked together.

7. Apparatus in accordance with claim 2 wherein one or more data processing units with data storage units for storing data sets are linked together.

8. Apparatus in accordance with claim 1 wherein one or more data processing units with data storage units for storing data sets are linked together.

9. A method of operating a data processing system including a data storage unit for storing data sets accessible to a user upon receipt of permission; comprising:
    configuring at least one processor to perform the steps of:
    restricting access to said data processing system by requiring an entry of a username as a logon identifier to initiate a session on a computer and then requiring an entry of a password to obtain permission for access to a data set stored in said data storage unit;

granting access to said system with said username and multiple passwords independently created and associated with said username by assigning various levels of access privileges to said passwords; and permitting a distinct level of access to a said data set for each password associated with said username.

10. A method in accordance with claim 9 wherein:

a user has one username associated with multiple data sets wherein said multiple data sets include said one data set, and said multiple data sets are accessible by entry of said username and said password.

11. A method in accordance with claim 10 wherein one password allows access with all privileges to interact with said data set; and another password associated with said username has fewer privileges to interact with said data set.

12. A method in accordance with claim 11 wherein one or more data processing units with data storage units for storing data sets are linked together.

13. A method in accordance with claim 10 wherein an owner of a username creates multiple passwords with different levels of privilege for multiple users of said data set.

14. A method in accordance with claim 13 wherein one or more data processing units with data storage units for storing data sets are linked together.

15. A method in accordance with claim 10 wherein one or more data processing units with data storage units for storing data sets are linked together.

16. A method in accordance with claim 9 wherein one or more data processing units with data storage units for storing data sets are linked together.

17. A computer program product embodied in a non-transitory computer readable storage medium having a computer program recorded therein, when executed by a processor, to perform the functions of responding to a username and multiple passwords for controlling access to data sets; said computer program comprising:

computer program code means for receiving a username and issuing a request for a password;

computer program password means for receiving a password and determining whether the password is valid;

computer program access control means for determining whether a level of access to a data set can be provided for a given valid password;

computer program access granting means for providing access to a data set upon granting of a level permission;

said data processing system having a restriction of requiring an entry of a username as a logon identifier to initiate a session on a computer and then requiring an entry of a password to obtain permission for access to a data set stored in said data storage unit;

said system being configured to support use of multiple passwords independently created and associated with said username so as to assign various levels of access privileges to said passwords; and each of said multiple passwords for said username permitting a distinct level of access to a said data set.

18. A computer program product in accordance with claim 17 wherein:

a user has one username associated with multiple data sets and with said multiple data sets including said one data set, and with said multiple data sets being accessible by entry of said one username and one of said multiple associated passwords.

19. A computer program product in accordance with claim 18 wherein:

one password allows access with all privileges to interact with said data set; and another password associated with said username has fewer privileges to interact with said data set.

20. A computer program product in accordance with claim 17 wherein an owner of a username creates many passwords with different levels of privilege for multiple users of said data set.

* * * * *